United States Patent
Nies et al.

(10) Patent No.: US 11,692,525 B2
(45) Date of Patent: Jul. 4, 2023

(54) METHOD OF MOUNTING A BLADE TO OR UNMOUNTING A BLADE FROM A ROTOR HUB OF A WIND TURBINE

(71) Applicant: General Electric Renovables Espana, S.L., Barcelona (ES)

(72) Inventors: Jacob Johannes Nies, Salzbergen (DE); Achim Koesters, Salzbergen (DE); Thomas Niehues, Salzbergen (DE)

(73) Assignee: General Eleclric Renovables Espana, S.L., Barcelona (ES)

( * ) Notice: Subject to any disclaimer, the term of this patent is extended or adjusted under 35 U.S.C. 154(b) by 0 days.

(21) Appl. No.: 17/557,778

(22) Filed: Dec. 21, 2021

(65) Prior Publication Data

US 2022/0195981 A1 Jun. 23, 2022

(30) Foreign Application Priority Data

Dec. 23, 2020 (EP) .................................... 20217044

(51) Int. Cl.
  *F03D 13/40* (2016.01)
  *F03D 1/06* (2006.01)
  *F03D 13/10* (2016.01)

(52) U.S. Cl.
  CPC ........... *F03D 1/0658* (2013.01); *F03D 13/10* (2016.05); *F03D 13/40* (2016.05); *F05B 2230/60* (2013.01); *F05B 2230/70* (2013.01)

(58) Field of Classification Search
  CPC .......... F03D 13/40; F03D 13/10; F03D 80/00; F03D 1/0633; F03D 1/0675;
  (Continued)

(56) References Cited

U.S. PATENT DOCUMENTS 8,360,398 B2   1/2013  Diaz De Corcuera et al.
9,719,487 B2   8/2017  Bech et al.
(Continued)

FOREIGN PATENT DOCUMENTS

DE   102010043199 A1   5/2012
EP       2832988 A      2/2015
(Continued)

OTHER PUBLICATIONS

European Search Report Corresponding to EP20217044 dated Jun. 22, 2021.

(Continued)

*Primary Examiner* — Moshe Wilensky
(74) *Attorney, Agent, or Firm* — Dority & Manning, P.A.

(57) ABSTRACT

A method (100) of mounting a blade (22) to or unmounting a blade (22) from a rotor hub (20) of a wind turbine (10), the wind turbine (10) comprising a tower (12) and a nacelle (16) mounted on the tower (12), the rotor hub (20) being coupled to the nacelle (16), the method (100) comprising gripping the blade (22) using a gripper (50), the gripper (50) comprising gripping members (58) configured for gripping the blade (22) and teeth (60) protruding from the gripping members (58), wherein gripping comprises inserting the teeth (60) of the gripper (50) into receptacles (78) of the blade (22); and rotating the blade (22) about a rotation axis (54) perpendicular to a longitudinal blade axis (53) using a blade rotation device (52) of the gripper (50), wherein the teeth (60) are configured for transmitting an axial load (57) of the blade (22) between the blade (22) and the gripping members (58).

5 Claims, 8 Drawing Sheets

(58) Field of Classification Search
CPC ............... F03D 1/0658; F05D 2260/30; F05D 2260/36; F05B 2230/604; F05B 2230/60; F05B 2230/61; F05B 2230/70

See application file for complete search history.

(56) References Cited

U.S. PATENT DOCUMENTS

| | | | |
|---|---|---|---|
| 10,393,091 | B2 | 8/2019 | Hancock et al. |
| 10,822,207 | B2 * | 11/2020 | Lopez-Benedito ..... B66C 13/16 |
| 11,459,213 | B2 * | 10/2022 | Brice ..................... B66C 1/108 |
| 2010/0003141 | A1 | 1/2010 | Hancock |
| 2013/0236324 | A1 | 9/2013 | Bech et al. |
| 2013/0323007 | A1 | 12/2013 | Falkenberg et al. |
| 2015/0028610 | A1 * | 1/2015 | Hansen ................... F03D 13/40 294/81.62 |
| 2015/0232307 | A1 | 8/2015 | Holloway et al. |
| 2018/0195497 | A1 | 7/2018 | Neumann |
| 2019/0257292 | A1 * | 8/2019 | Melen .................... F03D 13/10 |

FOREIGN PATENT DOCUMENTS

| | | |
|---|---|---|
| EP | 2670977 B1 | 5/2019 |
| WO | WO2017/036691 A1 | 3/2017 |
| WO | WO2017/071719 A1 | 5/2017 |

OTHER PUBLICATIONS

Liftra, LT870-1 Blade Yoke, Blade Yoke for lifting the REpower 615m and LM 615m blades 3 Pages. Retrieved Dec. 8, 2021 from https://liftra.com/product/blade-yoke-lt870/.

Liftra, LT975 Blade Dragon, 3 Pages. Retrieved Dec. 8, 2021 from https://liftra.com/product/blade-dragon/.

Liftra, LT5002-1 Blade Eagle, Blade Yoke for 73.2 m LM Blades, 3 Pages. Retrieved Dec. 8, 2021 from https://liftra.com/product/blade-yoke/.

Moulin, New Rotor Blade Lifter Allows Assembly in Bunny-Ear Configuration for Gearless Wind Turbines, Energetica India, Aug. 20, 2014, 3 Pages. Retrieved Dec. 8, 2021 from http://www.energetica-india.net/news/new-rotor-blade-lifter-allows-assembly-in-bunny-ear-configuration-for-gearless-wind-turbines.

* cited by examiner

METHOD OF MOUNTING A BLADE TO OR UNMOUNTING A BLADE FROM A ROTOR HUB OF A WIND TURBINE

FIELD

The present disclosure relates generally to wind turbines, and more particularly to a method of mounting a blade to or unmounting a blade from a rotor hub of a wind turbine.

BACKGROUND

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

The size of rotor blades contributes to the energy efficiency of wind turbines. In particular, an increase in rotor blade size can increase the energy production of a wind turbine. The economic benefits of increased wind turbine sizes or rotor blade sizes must be weighed against respective costs of manufacturing, transporting, assembly or repair of the wind turbines. Often, the assembly of a wind turbine involves mounting a rotor hub of the rotor to the nacelle on top of the tower, and lifting each rotor blade individually to the rotor hub using a crane. For example, the blade may be lifted and installed to the rotor hub with a blade axis oriented in a horizontal direction.

With increasing wind turbine size or blade size, cranes with increased height or increased lifting capacity may be used to lift the blades. However, the use of such cranes can increase costs associated with mounting or unmounting of blades to or from the rotor hub, for example during assembly or disassembly of the wind turbine, or during repair or replacement of rotor blades.

Accordingly, the present disclosure is directed to a method of mounting or unmounting a blade of a wind turbine that can provide a safe, fast and/or cost-efficient raising, lowering and/or positioning of blades for mounting or unmounting the blades.

BRIEF DESCRIPTION

Aspects and advantages of the invention will be set forth in part in the following description, or may be obvious from the description, or may be learned through practice of the invention.

In one aspect, the present disclosure is directed to a method of mounting a blade to or unmounting a blade from a rotor hub of a wind turbine, the wind turbine comprising a tower and a nacelle mounted on the tower, the rotor hub being coupled to the nacelle. The method includes gripping the blade using a gripper, the gripper including gripping members configured for gripping the blade and teeth protruding from the gripping members, wherein gripping includes inserting the teeth of the gripper into receptacles of the blade. The method includes rotating the blade about a rotation axis perpendicular to a longitudinal blade axis using a blade rotation device of the gripper, wherein the teeth are configured for transmitting an axial load of the blade between the blade and the gripping members. It should be understood that the method may further include any of the additional steps and/or features as described herein.

In another aspect, the present disclosure is directed to a gripper for mounting a blade to or unmounting a blade from a rotor hub of a wind turbine. The gripper includes a blade rotation device configured for rotating the blade about a rotation axis perpendicular to a longitudinal blade axis of the blade, gripping members configured for gripping the blade, and teeth arranged on the gripping members, the teeth being configured to be inserted into receptacles of the blade, and wherein the teeth are configured for transmitting an axial load of the blade between the blade and the gripping members. It should be understood that the gripper may further include any of the additional features as described herein.

In a further aspect, the present disclosure is directed to a blade for a wind turbine. The blade includes an outer skin, a load-bearing structure arranged within the outer skin, and receptacles connected to the load-bearing structure and extending through the outer skin, wherein the receptacles are configured for receiving teeth of a gripper from outside the outer skin, and wherein the receptacles are configured to transmit an axial load of the blade between the load-bearing structure and teeth received in the receptacles. It should be understood that the blade may further include any of the additional features as described herein.

In yet another aspect, the present disclosure is directed to an adapter for handling a blade according to embodiments described herein. The adapter includes adapter teeth configured to be inserted into a first plurality of the receptacles of the blade, the adapter teeth having a locking element configured for locking the adapter teeth in the first plurality of the receptacles of the blade, the adapter teeth being configured for supporting the weight of the blade in a direction perpendicular to a longitudinal blade axis. The adapter includes an interlocking device configured for interlocking the adapter with a cargo-lifting device. It should be understood that the adapter may further include any of the additional features as described herein.

These and other features, aspects and advantages of the present invention will be further supported and described with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
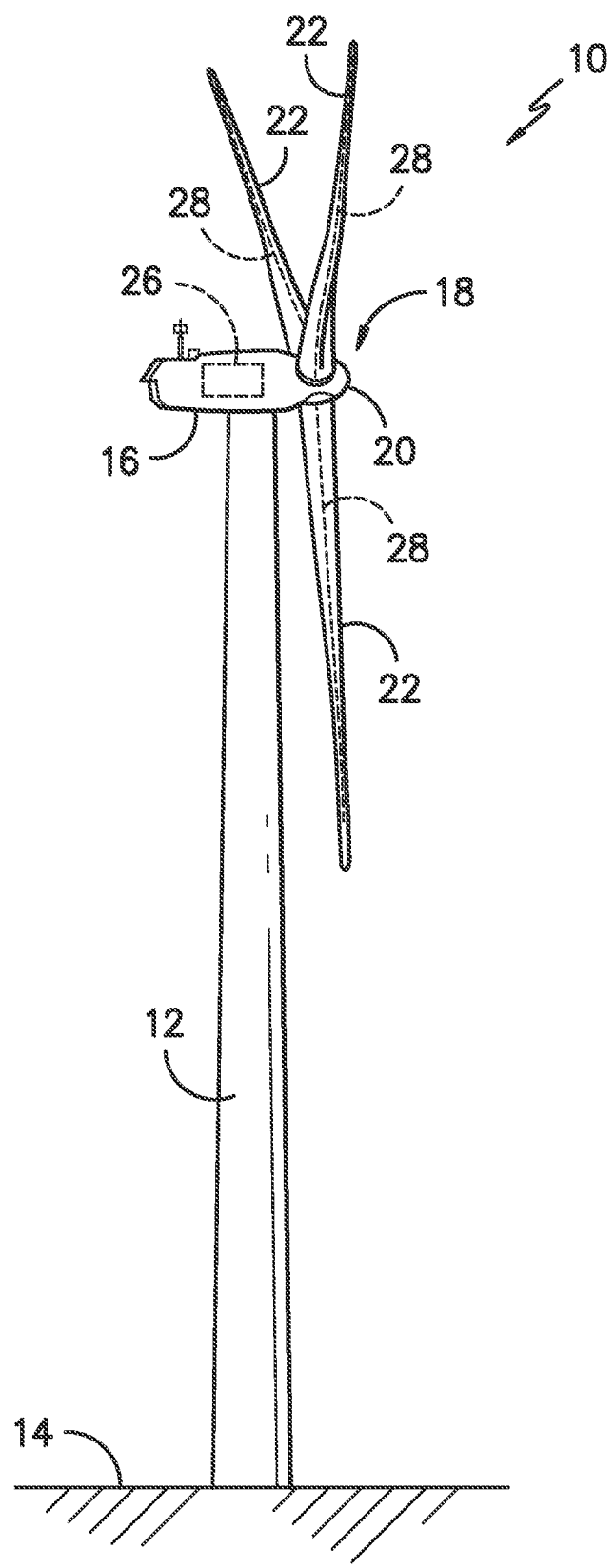
FIG. 1 illustrates a perspective view of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a perspective view of a wind turbine 10 according to the present disclosure. As shown, the wind turbine 10 generally includes a tower 12 extending from a support surface 14 (herein also referred to as ground), a nacelle 16 mounted on the tower 12, and a rotor 18 coupled to the nacelle 16.

As shown in FIG. 1, the rotor 18 includes a rotatable rotor hub 20 and at least one blade 22 coupled to and extending outwardly from the rotor hub 20. For example, in the illustrated embodiment, the rotor 18 includes three blades 22. However, in an alternative embodiment, the rotor 18 may include more or less than three blades 22. Each blade 22 may be spaced about the rotor hub 20 to facilitate rotating the rotor 18 to enable kinetic energy to be transferred from the wind into usable mechanical energy, and subsequently, electrical energy. For instance, the rotor hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the components. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals.

Figure 2:
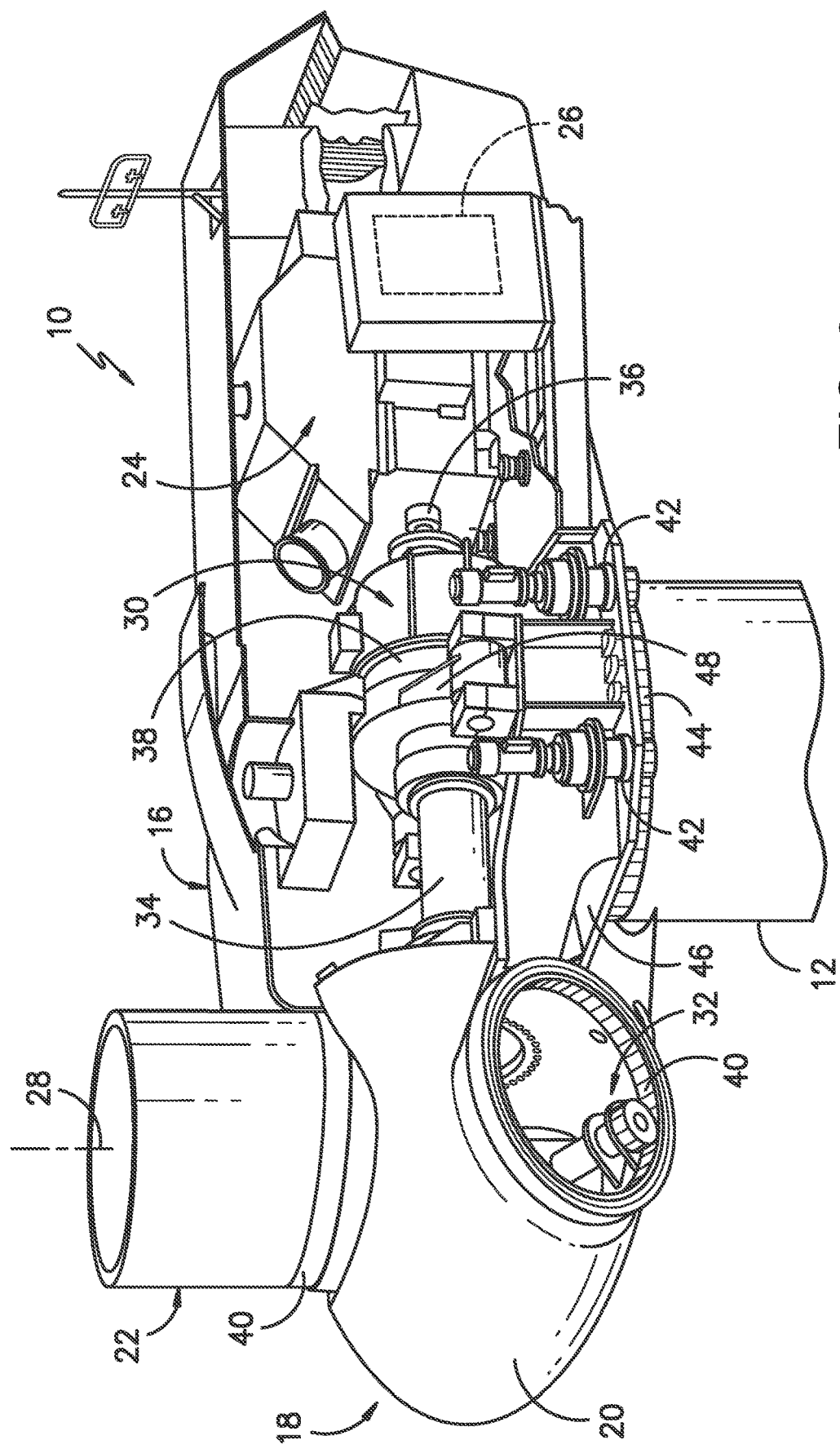
FIG. 2 illustrates a simplified, internal view of a nacelle of a wind turbine, particularly illustrating the nacelle during normal operation.

Referring now to FIG. 2, a simplified, internal view of the nacelle 16 of the wind turbine 10 shown in FIG. 1, particularly illustrating the drivetrain components thereof, is illustrated. More specifically, as shown, the generator 24 may be coupled to the rotor 18 for producing electrical power from the rotational energy generated by the rotor 18. The rotor 18 may be coupled to the main shaft 34, which is rotatable via a main bearing (not shown). The main shaft 34 may, in turn, be rotatably coupled to a gearbox output shaft 36 of the generator 24 through a gearbox 30. The gearbox 30 may include a gearbox housing 38 that is connected to the bedplate 46 by one or more torque arms 48. More specifically, in certain embodiments, the bedplate 46 may be a forged component in which the main bearing (not shown) is seated and through which the main shaft 34 extends. As is generally understood, the main shaft 34 provides a low speed, high torque input to the gearbox 30 in response to rotation of the rotor blades 22 and the rotor hub 20. Thus, the gearbox 30 converts the low speed, high torque input to a high speed, low torque output to drive the gearbox output shaft 36 and, thus, the generator 24.

Each blade 22 may also include a pitch adjustment mechanism 32 configured to rotate each blade 22 about its pitch axis 28 via a pitch bearing 40. Similarly, the wind turbine 10 may include one or more yaw drive mechanisms 42 communicatively coupled to the controller 26, with each yaw drive mechanism(s) 42 being configured to change the angle of the nacelle 16 relative to the wind (e.g., by engaging a yaw bearing 44 of the wind turbine 10).

Mounting or unmounting of the blades to or from a rotor hub for assembly, disassembly or repair of the wind turbine often involves lifting or lowering a blade with the longitudinal blade axis oriented in a horizontal direction. Gripping the blade with a gripper and tilting the blade with respect to the horizontal axis may involve high gripping forces, particularly with a risk of damaging or crushing the blade or an outer skin of the blade. As such, the present disclosure is directed to a method of mounting a blade 22 to or unmounting a blade 22 from a rotor hub 20 of a wind turbine 10 that can provide a safe, fast and/or cost-efficient raising, lowering or positioning of the blades 22 for mounting or unmounting the blades 22.

Figure 3:
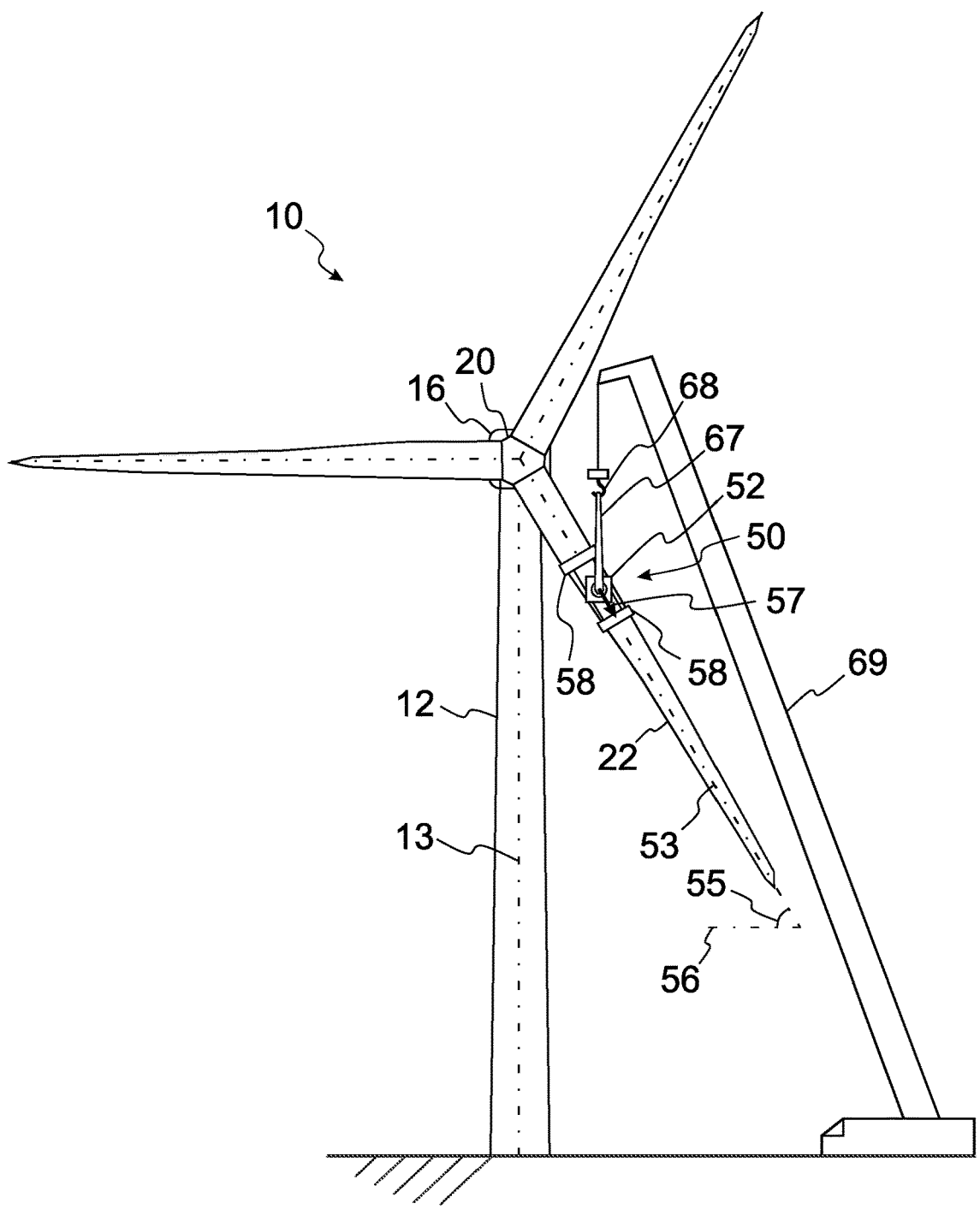
FIG. 3 illustrates a schematic view of a wind turbine during mounting of a blade to a rotor hub according to embodiments of the present disclosure.

According to embodiments of the present disclosure, a gripper 50 for mounting a blade 22 to or unmounting a blade 22 from a rotor hub 20 of a wind turbine 10 includes gripping members 58 configured for gripping the blade 22. For example, FIG. 3 shows a blade 22 being mounted to a rotor hub 20 of a wind turbine 10. The blade 22 is gripped by the gripper 50. In particular, the blade 22 in FIG. 3 is rotated to an inclined orientation of the blade 22 with respect to a reference plane 56 to match an orientation of a blade installation site of the rotor hub 20. The gripper 50 is hooked to a crane hook 68 of a crane 69.

In embodiments, the gripper 50 may be configured for gripping a central axial region of the blade 22, the central axial region particularly including a center of gravity of the blade 22. As used herein, the terms "axial", "radial" or "circumferential" are particularly understood with respect to a longitudinal blade axis 53 of the blade 22. The gripper 50 may be configured for gripping the blade using the gripping members 58 at a first axial position and at a second axial position, the center of gravity of the blade 22 particularly being disposed between the first axial position and the second axial position.

In embodiments, the gripper 50 includes at least two gripping members 58. The gripping members 58 can be configured for engaging a first side 85 of the blade 22 and a second side 86 of the blade 22. The first side 85 and the second side 86 may each extend between a leading edge 87 of the blade 22 and a trailing edge 88 of the blade 22, the first side 85 particularly being different from the second side 86, as shown, e.g., in FIG. 4. For example, the first side 85 may be a suction side of the blade 22. The second side 86 may be a pressure side of the blade 22.

Figure 5A:
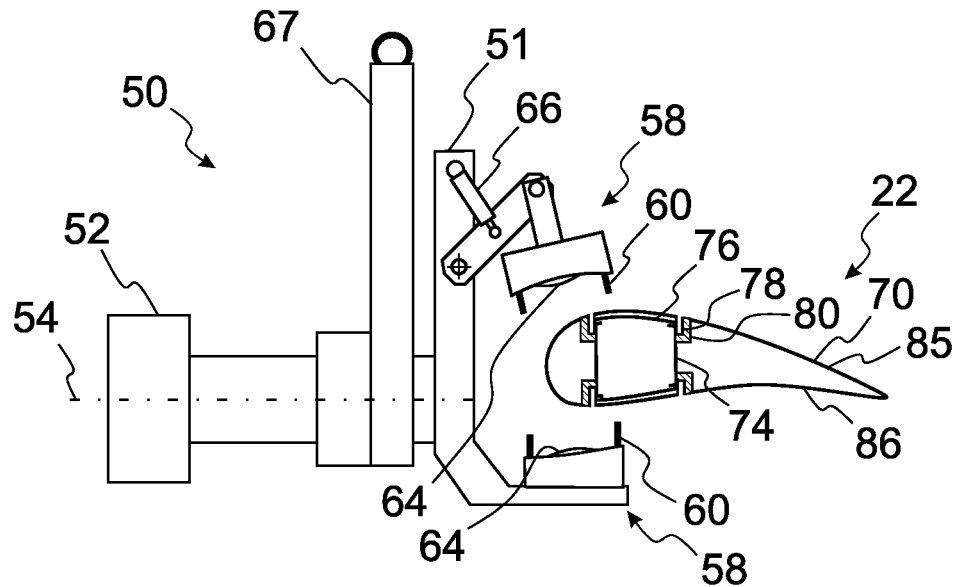
FIGS. 5A-5B illustrate schematic views of a gripper gripping a blade according to embodiments.
Figure 5B:
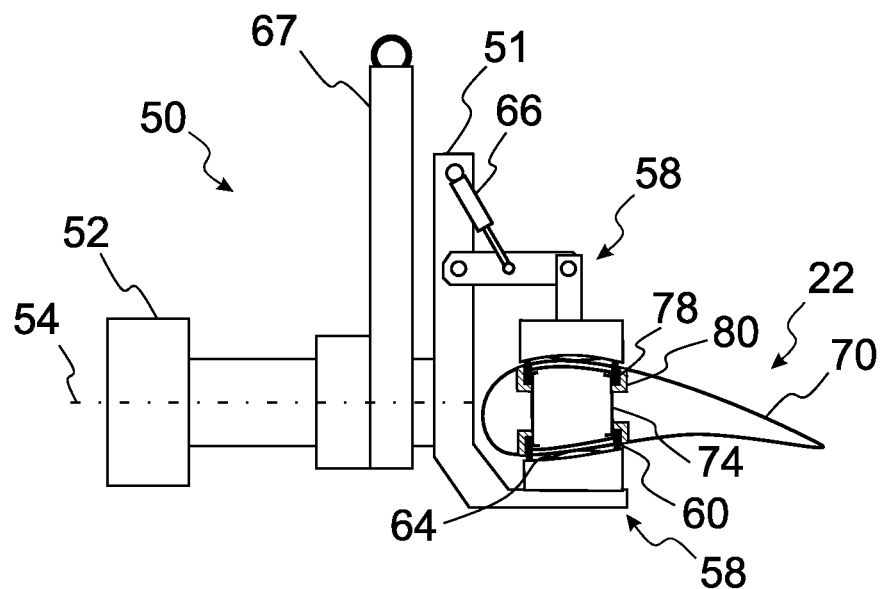

In some embodiments, the gripping members 58 include a first gripping member configured for engaging the first side 85 of the blade 22, and a second gripping member configured for engaging the second side 86 of the blade 22, as shown for example in FIGS. 5A and 5B. In some embodiments, the gripper 50 includes a gripping actuator 66 for actuating at least one gripping member of the gripping members 58. The gripping actuator 66 may be connected to gripper frame 51 of the gripper 50 and to the at least one gripping member. The gripping actuator 66 can be configured for actuating the at least one gripping member relative to the gripper frame 51, particularly towards and/or away from the outer skin 70 of the blade 22. For example, the gripping actuator 66 may include a hydraulic actuator, as exemplarily illustrated in FIGS. 5A and 5B. In embodiments, the gripping members 58 include gripper pads 64 configured for engaging or contacting the outer skin 70 of the blade 22.

According to embodiments, the gripper 50 includes a blade rotation device 52 configured for rotating the blade 22 about a rotation axis 54 perpendicular to a longitudinal blade axis 53 of the blade 22. In embodiments, the rotation axis 54 can be at least substantially perpendicular to a longitudinal tower axis 13 of the tower 12 (FIG. 3). The rotation axis 54 can be a horizontal axis. A horizontal axis, horizontal direction or horizontal plane as used herein is particularly understood as being at least substantially perpendicular to the direction of the gravitational force. A vertical direction may be understood as being directed in a direction of the gravitational force. In some embodiments, the blade rotation device 52 may be configured for rotating the blade 22 about a vertical axis.

In embodiments, the blade rotation device 52 includes a first device part and a second device part. The blade rotation device 52 may include a motor for rotating the first device part relative to the second device part. The first device part may be connected to a crane link 67 of the gripper 50. The crane link 67 of the gripper 50 may be configured for hooking the gripper 50 to a crane hook 68 of a crane 69. The second device part may for example be connected to the gripper frame 51 of the gripper 50 or to the gripping members 58.

In some embodiments, the gripper 50 is configured for rotating the blade 22 to an inclined orientation using the blade rotation device 52. In the inclined orientation, an angle 55 between the longitudinal blade axis 53 and a reference plane 56 perpendicular to a longitudinal tower axis 13 can be larger than 20 degrees, particularly larger than 25 degrees, and/or maximum 60 degrees, particularly maximum 50 degrees or maximum 45 degrees. For example, the gripper 50 may be configured for rotating the blade 22 to an angle 55 of up to 30 degrees. Rotating the blade 22 to an inclined orientation between a horizontal orientation and a vertical orientation may for example require a smaller counterweight to balance the weight of the blade 22 relative to the crane link 67 as compared to a vertical orientation of the blade 22.

In embodiments, the gripper 50 may be configured for rotating the blade 22 to an angle 55 larger than 30 degrees, particularly larger than 45 degrees or larger than 60 degrees. For example, the gripper 50 can be configured for rotating the blade 22 to an angle 55 of up to 90 degrees. Rotating the blade 22 to an orientation closer to a vertical orientation or to a vertical orientation may for example reduce a crane height needed to move the blade 22 between the support surface 14 and the rotor hub 20.

In some embodiments, the gripper 50 is configured to rotate the blade 22 such that a root of the blade 22 points in an upward direction. In embodiments, the gripper 50 can be configured to rotate the blade 22 such that the root points in a downward direction. An upward direction and a downward direction are to be understood particularly with respect to a direction of the gravitational force.

According to embodiments of the present disclosure, the gripper 50 includes teeth 60 arranged on the gripping members 58. The teeth 60 are configured to be inserted into receptacles 78 of the blade 22, as shown for example in FIG. 5B. The teeth 60 may be configured for transmitting an axial load 57 of the blade 22 between the blade 22 and the gripping members 58. The axial load 57 may be a load of the blade 22 directed in an axial direction of the longitudinal blade axis 53. The axial load 57 can for example include an axial component of a gravitational load of the blade 22. The axial load 57 may include an axial component of a wind load of the blade 22. For example, in an inclined orientation of the blade 22, as shown for example in FIG. 3, the teeth 60 may transmit the axial load 57 of the blade 22 to the gripping members 58 of the gripper 50. The gripping members 58 may support a transverse load of the blade 22, particularly via the gripper pads 64 of the gripping members 58. The transverse load may particularly include a transverse component of the gravitational load of the blade 22 and/or of a wind load of the blade 22, the transverse component being perpendicular to the longitudinal blade axis 53.

In some embodiments, the teeth 60 can be movably connected to the gripping members 58, particularly via a bearing, e.g., a slide bearing. In further embodiments, the teeth 60 may be rigidly connected to the gripping members 58. In embodiments, the axial load 57 of the blade 22 is supported on the teeth 60 by a form-fitting connection or positive locking between the teeth 60 and the receptacles 78. In particular, a gravitational load of the blade 22 in an axial direction can be supported at least partially by the teeth 60 and the receptacles 78, and not only via a friction force between gripper pads 64 of the gripper 50 and an outer skin 70 of the blade 22.

In some embodiments, the teeth 60 can be configured for balancing the axial load 57 among the teeth 60. In particular, the teeth 60 may be elastically configured for balancing the axial load 57 among the teeth 60 or on the individual teeth 60. An elasticity or flexibility of the teeth 60 may particularly be higher in an axial direction than in a radial direction or in a circumferential direction.

In embodiments, the teeth 60 can be shaped for example as pins or as cuboids. In particular, the teeth 60 may be formed straight or curved. The teeth 60 may be comprised of metal, for example of steel. In embodiments, the teeth 60 may be configured to transmit an axial load 57 of at least 10 kN, particularly of at least 30 kN, of at least 50 kN or of at least 80 kN. In some embodiments, the teeth 60 are configured to transmit an axial load 57 of at least 25% of the blade weight, particularly at least 50% of the blade weight, at least 75% of the blade weight or at least the blade weight.

According to embodiments, at least one tooth of the teeth 60 protrudes from each of a first gripping member, the first gripping member being configured for engaging the first side 85 of the blade 22, and a second gripping member, the second gripping member being configured for engaging the second side 86 of the blade 22. A gripper 50 with gripping members 58 including a first gripping member and a second gripping member is illustrated for example in FIGS. 5A and 5B. The teeth 60 protruding from the gripping members 58 are inserted into receptacles 78 of the blade 22 (FIG. 5B). In an inclined orientation of the blade 22 (FIG. 3), the axial load 57 of the blade 22 can be supported on the teeth 60, the teeth 60 transmitting the axial load 57 to the gripping members 58. In embodiments, the gripper 50 may particularly include more than one first gripping member and/or more than one second gripping member. The axial load 57 may be supported on the teeth 60 at different positions with respect to an axial direction of the blade 22 and/or with respect to a flapwise direction of the blade 22.

In some embodiments, the gripping members 58 include a tooth engaging device 62 configured for moving the teeth 60 from a retracted position to an extended position, wherein in the retracted position the teeth 60 are at least partially retracted into the gripping members 58, and wherein in the extended position the teeth 60 are inserted into the receptacles 78. In particular, in the extended position the teeth 60 may be positioned further out of the gripping members 58 than in the retracted position. In embodiments, in the retracted position the teeth 60 may be retracted within a surface of a gripping member 58 or within an outer contour of the gripping member 58. In some embodiments, the tooth engaging device 62 may include a resilient device such as a spring, an actuator device such as a hydraulic actuator, a pneumatic actuator, an electric actuator such as an electric motor, an electromagnetic actuator, or any combination thereof.

According to some embodiments, the tooth engaging device 62 includes a resilient device, the resilient device loading at least one tooth of the teeth 60 towards the extended position of the at least one tooth. For example, the resilient device may include a spring, as shown for example in FIGS. 6A-8B. In some embodiments, the gripping member 58 may include a tooth retracting device 63. The tooth retracting device 63 may be configured for retracting the at least one tooth from the extended position to the retracted position. In embodiments, the tooth engaging device 62 and the tooth retracting device 63 may include an actuator device, for example an electric actuator, configured for moving the at least one tooth to the extended position and configured for moving the at least one tooth to the retracted position. In further embodiments, the tooth engaging device 62 and the tooth retracting device 63 may be different devices.

As shown for example in FIGS. 6A-6D, the tooth engaging device 62 may include a spring. The tooth 60 may include a magnetic material. The tooth retracting device 63 may include an electromagnetic actuator, particularly a coil. The electromagnetic actuator may be configured for moving the tooth 60 against a resilient force of the tooth engaging device 62 to the retracted position or hold the tooth 60 in the retracted position. In embodiments, the tooth retracting device 63 may be configured for a retracting state, in which a force of the tooth retracting device 63 biases the tooth 60 towards the retracted position, and for a released state, in which a force of the tooth retracting device 63 is reduced with respect to the retracting state and in which the tooth 60 is biased by the tooth engaging device 62 towards the extended state.

According to some embodiments, the gripping members 58 include a tooth locking device 65. The tooth locking device 65 may be configured for locking a tooth 60 in the retracted position and/or configured for locking the tooth 60 in the extended position. In embodiments, the tooth locking device 65 is configured for a locked state in which the tooth 60 is not movable between the retracted position and the extended position, and configured for an unlocked state, in which the tooth 60 is movable between the retracted position and the extended position. The tooth locking device 65 may for example include a latch pin and a latching actuator, the latching actuator being configured to lock the tooth 60 using the latch pin in the locked state (FIGS. 6A and 6D), and to release the tooth 60 in the unlocked state (FIGS. 6B and 6C).

Figure 6A:
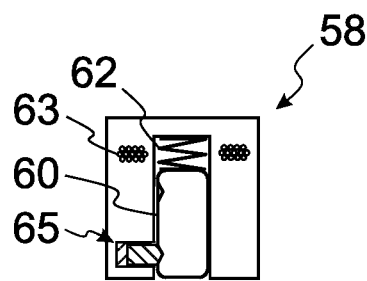
FIGS. 6A-6D illustrate schematic sectional views of a gripping member and teeth according to embodiments.
Figure 6B:
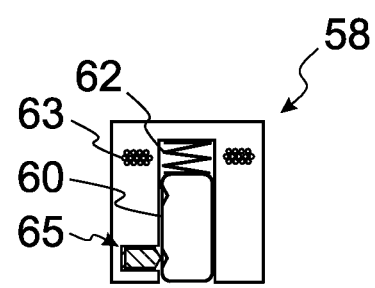

FIG. 6A illustrates a gripping member 58 and a tooth 60 in a locked retracted state. The tooth 60 is in the retracted position. The tooth locking device 65 is in a locked state, locking the tooth 60 in the retracted position. The tooth 60 may be arranged in the retracted position and in a locked state for example before the gripping members 58 engage an outer skin 70 of the blade 22. FIG. 6B illustrates the tooth 60 in the retracted position and in an unlocked state of the tooth locking device 65. For example, after engaging the outer skin 70 of the blade 22 with the gripping members 58, the tooth 60 may be loaded by the tooth engaging device 62 towards the extended position. In particular the tooth retracting device 63 may be in a released state. The outer skin 70 of the blade 22 may prevent the tooth 60 from moving to the extended position, particularly if the tooth 60 is not spatially aligned with a receptacle 78 of the blade 22.

Figure 6C:
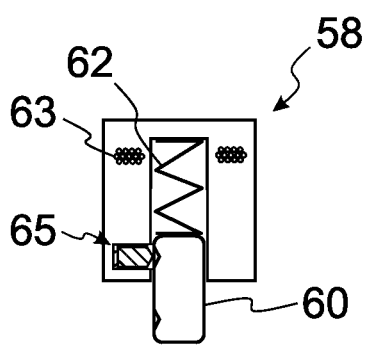

According to some embodiments, the tooth 60 may be unlocked by switching the tooth locking device 65 to the unlocked state and moved to the extended position by the tooth engaging device 62 before engaging the outer skin 70 (FIG. 6C). The tooth 60 may be forced back to the retracted position, when the gripping members 58 engage the outer skin 70 of the blade 22, particularly if the tooth 60 is not spatially aligned with a receptacle 78 of the blade 22.

Figure 6D:
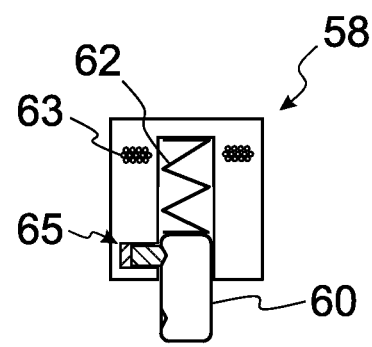
Figure 7A:
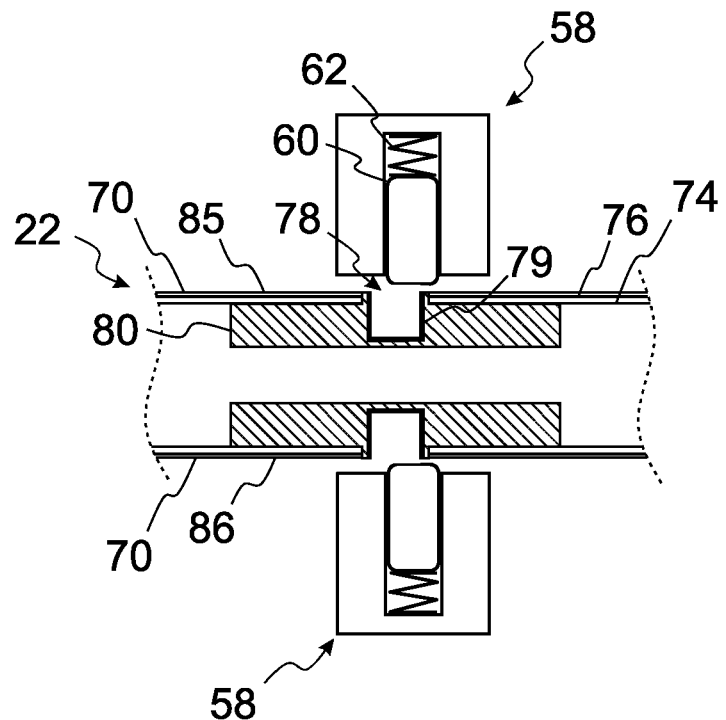
FIGS. 7A-7B illustrate schematic sectional views of a gripper gripping a blade according to embodiments.
Figure 7B:
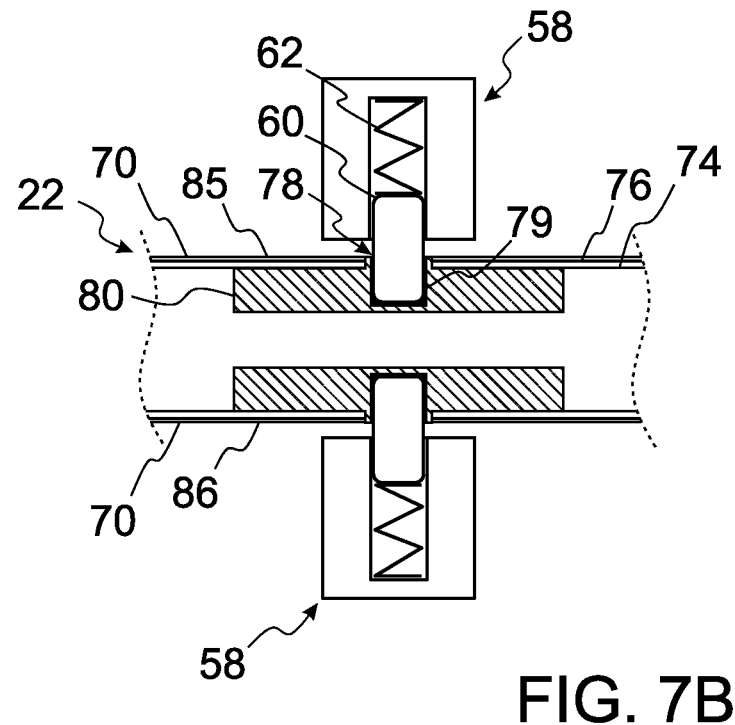

As particularly illustrated in FIG. 7A (the tooth locking device 65 and the tooth retracting device 63 are omitted in FIGS. 7A-7B for clarity), the gripping members 58 may be moved along the outer skin 70 of the blade 22 to align the teeth 60 and the receptacles 78 of the blade 22. In embodiments, the resilient device of the tooth engaging device 62 may be configured for inserting or snapping the teeth 60 into the receptacles 78 of the blade 22, particularly when the teeth 60 and the receptacles 78 are spatially aligned. For example, in FIG. 7B the teeth 60 are snapped into the receptacles 78 of the blade 22 after spatial alignment of the teeth 60 and the receptacles 78. During inserting of the tooth 60 into the receptacle 78, the tooth 60 is extended to the extended position. FIG. 6C shows the tooth 60 in the extended position. The tooth 60 may be locked in the extended position by switching the tooth locking device 65 to the locked state (FIG. 6D). For example, after locking the teeth 60 in the receptacles 78 of the blade 22, the blade 22 may be raised towards the rotor hub 20 for mounting the blade 22 to the rotor hub 20 or lowered towards the support surface 14 for unmounting the blade 22 from the rotor hub 20, and/or rotated using the blade rotation device 52.

For releasing the blade 22 from the gripper 50 or for resetting the gripping member 58 and the tooth 60 to the locked retracted state, the tooth 60 may for example be unlocked by switching the tooth locking device 65 to the unlocked state (FIG. 6C). The tooth 60 can be retracted to the retracted position by switching the tooth retracting device 63 to the retracting state (FIG. 6B). The tooth 60 may be locked in the retracted position by switching the tooth locking device 65 to the locked state (FIG. 6A). The gripping members 58 may disengage the outer skin 70 of the blade 22, particularly after the teeth 60 are retracted to the retracted position.

In some embodiments, at least one of the tooth engaging device 62, the tooth locking device 65 and the tooth retracting device 63 is remotely controllable. For example, the tooth locking device 65 and the tooth retracting device 63 may be remotely controllable.

According to embodiments of the present disclosure, a blade 22 for a wind turbine 10 includes an outer skin 70. The outer skin 70 may provide an outer surface of the blade 22, in particular a first side 85 of the blade 22 and a second side 86 of the blade 22 according to embodiments described herein. The blade 22 includes a load-bearing structure 72 arranged within the outer skin 70. The load-bearing structure 72 may include particularly a shear web 74 and/or a spar cap 76. For example, shear webs 74 and spar caps 76 of the load-bearing structure 72 may particularly be arranged as a shear box, as illustrated, e.g., in FIG. 4.

According to embodiments, the blade 22 includes receptacles 78 connected to the load-bearing structure 72 and extending through the outer skin 70. In embodiments, the receptacles 78 are configured for receiving teeth 60 of a gripper 50 from outside the outer skin 70, particularly from a gripper 50 according to embodiments described herein. The receptacles 78 are configured to transmit an axial load 57 of the blade 22 between the load-bearing structure 72 and teeth 60 received in the receptacles 78. In embodiments, the receptacles 78 are provided on the first side 85 and/or on the second side 86 of the blade 22. In particular, first receptacles of the receptacles 78 can be provided on the first side 85 of the blade 22, and second receptacles of the receptacles 78 can be provided on the second side 86 of the blade 22. In some embodiments, the receptacles 78 are axially positioned around the center of gravity of the blade 22. The receptacles 78 can be positioned around the center of gravity of the blade 22 in a chordwise direction. The receptacles 78 may be positioned to one or both sides of the spar caps 76 in a chordwise direction, particularly outside a chordwise spar cap region and more particularly not within the chordwise spar cap region. For example, the receptacles may be positioned such that the structural integrity of the spar caps is not reduced.

In some embodiments, the blade 22 includes a reinforcing member 80 connecting one or more receptacles 78 to a shear web 74 of the load-bearing structure 72 and/or to a spar cap 76 of the load-bearing structure 72. In embodiments, the receptacles 78 may include a sleeve 79, particularly a metal sleeve or more particularly a steel sleeve. The receptacle 78 may be connected to the reinforcing member 80 using an adhesive, e.g., a resin. In further embodiments, the receptacles 78 may be integrally formed with the reinforcing member 80. In embodiments, the reinforcing member 80 is connected to the load-bearing structure 72, for example bolted to the shear web 74. In some embodiments, an axial length of the reinforcing member 80 may be longer than a flapwise depth of the receptacles 78. The axial length of the reinforcing member 80 may be longer than a chordwise length of the reinforcing member 80 and/or longer than a flapwise length of the reinforcing member 80. In embodiments, the reinforcing member 80 is configured for transmitting at least a portion of the axial load 57 between the load-bearing structure 72 and the receptacles 78.

Figure 4:
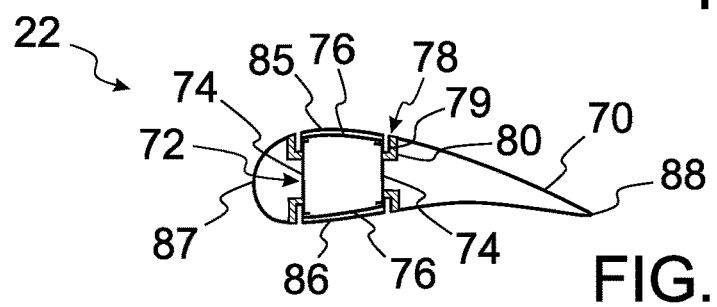
FIG. 4 illustrates a schematic sectional view of a blade according to embodiments.

For example, FIG. 4 shows receptacles 78 each including a sleeve 79 connected to a reinforcing member 80. FIGS. 7A to 8B particularly illustrate sections along an axial direction of blades 22 according to embodiments. The reinforcing member 80 extends in a direction of the longitudinal blade axis 53 and is connected to the shear web 73. The receptacles 78 are configured for receiving teeth 60 of a gripper 50.

According to some embodiments, the outer skin 70 includes at least one reinforced skin patch positioned around the receptacles 78. In particular, the reinforced skin patch may be positioned in a gripping region configured for gripping the blade 22 using a gripper 50. A reinforced skin thickness of the reinforced skin patch may be thicker than a skin thickness of a skin region of the outer skin 70, the skin region being disposed axially offset with respect to the reinforced skin patch and disposed outside or adjacent to the gripping region. The outer skin 70 may be locally reinforced with the at least one reinforced skin patch to withstand a pressure or a sliding of the teeth 60 over the outer skin 70.

In some embodiments, each receptacle 78 includes a receptacle closing device 81 configured for closing the receptacle 78, when a tooth 60 of a gripper 50 is removed from the receptacle 78. In particular, the receptacle closing device 81 may be configured for automatically closing the receptacle 78. In embodiments, the receptacle closing device 81 includes a resilient mechanism 84. The resilient mechanism 84 may include a spring, e.g., a coil spring or a spring plate. In some embodiments, the receptacle closing device 81 includes a plug 82. The plug 82 may be movably disposed in the receptacle 78. In particular, the plug 82 may be movable in a flapwise direction. The plug 82 can include a pin, the pin being insertable into the receptacle 78 and movable in the receptacle 78. The receptacle closing device 81, particularly the plug 82, can include a flexible seal. The flexible seal may be configured for sealing the receptacle 78 against water entering the receptacle 78. The flexible seal can be mounted to the pin of the plug 82.

Figure 8A:
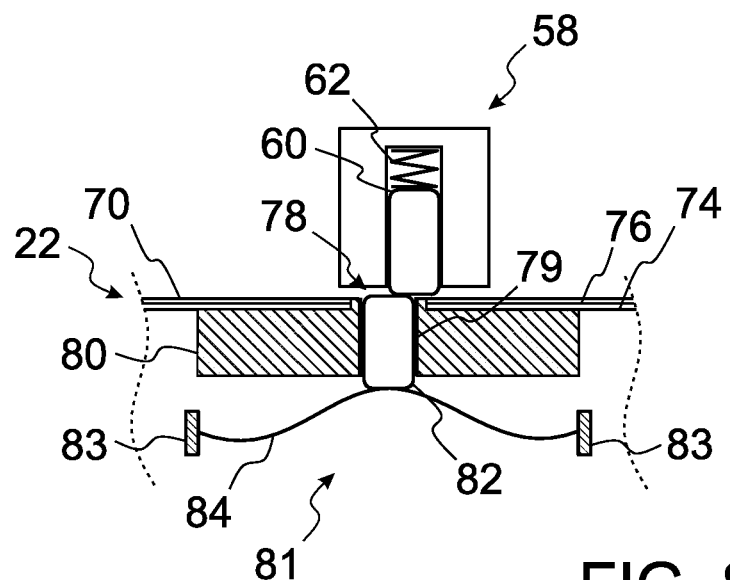
FIGS. 8A-8B illustrate schematic sectional views of a gripper gripping a blade according to embodiments.
Figure 8B:
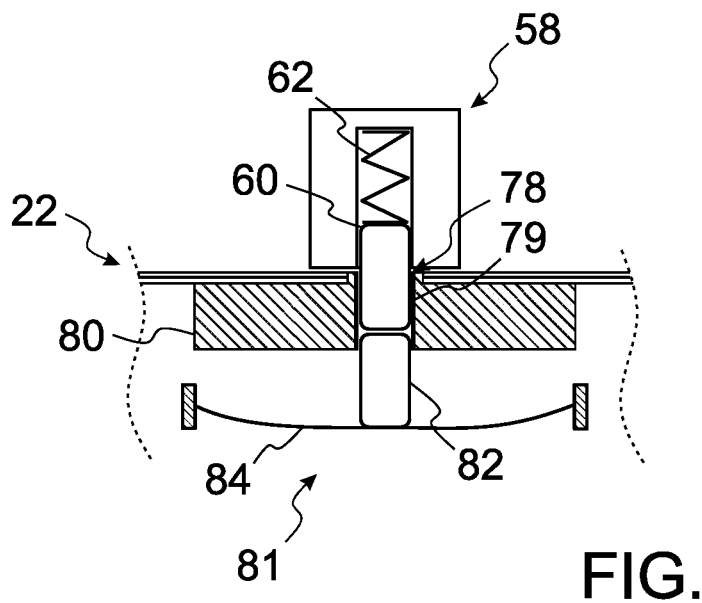

In embodiments, the resilient mechanism 84 of the receptacle closing device 81 is configured for loading the plug 82 within the receptacle 78 towards the outer skin 70. For example, the resilient mechanism 84 can be configured for pushing the plug 82 to a position within the receptacle 78 such that an outer plug surface of the plug 82 is at least substantially flush with an outer surface of the outer skin 70. The receptacle closing device 81 may be configured such that the plug 82 is pushed towards an inside of the blade 22, when a tooth 60 is inserted into the receptacle 78. For example, FIGS. 8A-8B show a blade 22 and a gripping member 58. The blade 22 includes a receptacle 78 having a sleeve 79 connected to a reinforcing member 80. The receptacle 78 includes a receptacle closing device 81 having a resilient mechanism 84, particularly a spring plate. The resilient mechanism 84 is supported by a resilient mechanism support 83 connected to the shear web 74. The receptacle closing device 81 includes a plug 82 disposed within the sleeve 79. In the absence of a tooth 60 inserted into the receptacle 78, the plug 82 is positioned at a closing position within the receptacle 78. In particular, in the closing position the plug 82 is positioned such that an outer plug surface of the plug 82 is flush with an outer surface of the outer skin 70 (FIG. 8A). When a tooth 60 is pushed into the receptacle 78 for inserting the tooth 60 into the receptacle 78, e.g., by the tooth engaging device 62 of the gripping member 58, the plug 82 is pushed towards the inside of the blade 22 (FIG. 8B). The plug 82 can be automatically pushed back to the closing position by the resilient mechanism 84 when removing the tooth 60 from the receptacle 78.

Figure 9:
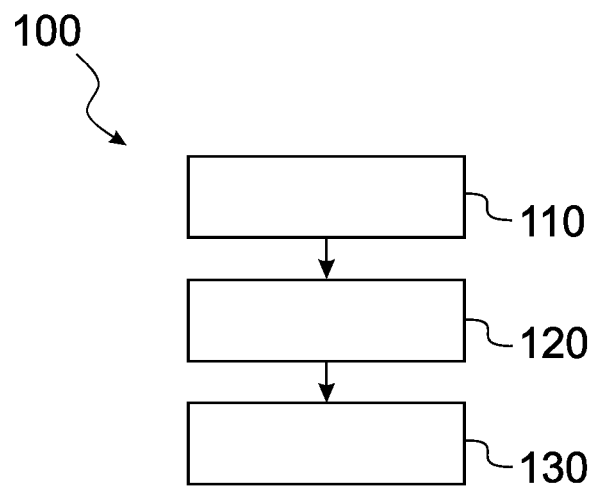
FIG. 9 illustrates a flow diagram of a method according to embodiments.

According to embodiments of the present disclosure, a method 100 of mounting a blade 22 to or unmounting a blade 22 from a rotor hub 20 of a wind turbine 10 is provided. In particular, the method may be used to mount or unmount a blade 22 according to embodiments described herein and/or the method may include using a gripper 50 according to embodiments described herein. For example, FIG. 9 illustrates a flow diagram of a method 100 according to embodiments.

At 110, the method 100 includes gripping the blade 22 using a gripper 50. In embodiments, the gripper 50 includes gripping members 58 configured for gripping the blade 22 and teeth 60 protruding from the gripping members 58. The blade 22 may include receptacles 78 configured for receiving the teeth 60 of the gripper 50. At 110, gripping includes inserting the teeth 60 of the gripper 50 into receptacles 78 of the blade 22. The blade 22 may be gripped by the gripping members 58 around the center of gravity of the blade 22, particularly at a first axial position and at a second axial position, wherein the center of gravity of the blade 22 is disposed between the first axial position and the second axial position.

In some embodiments, inserting the teeth 60 includes inserting first teeth of the teeth 60 into first receptacles of the receptacles 78 on a first side 85 of the blade 22, and inserting second teeth of the teeth 60 into second receptacles of the receptacles 78 on a second side 86 of the blade 22. The first side 85 and the second side 86 of the blade 22 may be configured according to embodiments described herein.

In embodiments, inserting the teeth 60 can include extending the teeth 60 from a retracted position to an extended position to engage the receptacles 78 of the blade 22. In particular, extending the teeth 60 may include snapping the teeth 60 into the receptacles, for example using a resilient device. Extending the teeth 60 may be performed according to embodiments described herein, particularly as described with respect to FIGS. 6A-7B.

According to embodiments, inserting the teeth 60 can include pushing a plug 82 of a receptacle closing device 81 towards an inside of the blade 22, particularly according to embodiments described herein (e.g., FIGS. 8A-8B).

In some embodiments, gripping the blade 22 includes engaging an outer skin 70 of the blade 22 with gripper pads 64 of the gripping members 58. In particular, the gripper pads 64 may be brought into contact with the outer skin 70, particularly with the first side 85 and the second side 86 of the blade 22. Engaging the outer skin 70 of the blade 22 may include actuating at least one of the gripping members 58 towards the outer skin 70, for example using a gripping actuator 66.

In some embodiments of the method 100, particularly of a method of unmounting a blade 22 from a rotor hub 20, the method 100 may include disconnecting the blade 22 from the rotor hub 20, particularly after gripping the blade 22.

According to some embodiments, for example at 120 in FIG. 9, the method 100 may include moving the blade 22 using the gripper 50, particularly towards the support surface 14 or towards the rotor hub 20. In embodiments, the blade 22 may be moved in a vertical direction using the gripper 50. The gripper 50 and the blade 22 may be moved by a crane 69, the gripper 50 being hooked to a crane hook 68 of the crane 69. In embodiments of a method 100 of unmounting a blade 22, moving the blade 22 may include lowering the blade 22 towards the support surface 14. In embodiments of a method 100 of mounting a blade 22 to the rotor hub 20, moving the blade 22 may include raising the blade 22 towards the rotor hub 20.

At 130, the method 100 includes rotating the blade 22 about a rotation axis 54 perpendicular to a longitudinal blade axis 53 using a blade rotation device 52 of the gripper 50. In embodiments, the rotation axis 54 can be at least substantially perpendicular to a longitudinal tower axis 13 of the tower 12. The rotation axis 54 can be a horizontal axis. In further embodiments, the rotation axis 54 may be a vertical axis.

In embodiments, the teeth 60 are configured for transmitting an axial load 57 of the blade 22 between the blade 22 and the gripping members 58. In particular, when the blade 22 is rotated to an inclined orientation of the blade 22, the inclined orientation being inclined with respect to a reference plane 56 or a horizontal plane, the axial load 57 may include an axial component of a gravitational load of the blade 22.

In embodiments of a method 100 of unmounting a blade 22 from a rotor hub 20, rotating the blade 22 may include rotating the blade 22 to match an inclination of the support surface 14. For example, the blade 22 may be rotated to an at least substantially horizontal orientation. In embodiments of a method 100 of mounting a blade 22 to a rotor hub 20, the blade 22 may be rotated to an inclined orientation matching an orientation of a blade installation site of the rotor hub 20.

In some embodiments, rotating the blade 22 includes rotating the blade 22 by an angle 55 according to embodiments described herein, particularly by an angle 55 of at least 20 degrees about the rotation axis 54 of the blade rotation device. In some embodiments, the blade 22 may be rotated such that the root of the blade 22 points in an upward direction. In embodiments, the blade 22 can be rotated the blade 22 such that the root points in a downward direction.

In some embodiments of the method 100, particularly of a method 100 of mounting a blade 22 to a rotor hub 20, the method 100 may include connecting the blade 22 to the rotor hub 20.

In embodiments, the method 100 includes releasing the blade 22 from the gripper 50. In particular, releasing the blade 22 may include retracting the teeth 60 from the receptacles 78. Releasing the blade 22 may include closing the receptacles 78. The receptacles may be closed automatically, e.g., by a receptacle closing device 81. In embodiments, releasing the blade 22 may include disengaging the gripping members 58, particularly gripper pads 64, from the outer skin 70 of the blade 22.

According to some embodiments, the blade 22 can be a segmented blade including at least two blade segments. The at least two blade segments can be joined at at least one blade joint, e.g. at one, two or more blade joints. For example, the segmented blade can include a root segment including a root of the blade 22. The segmented blade can include one or more extension segments configured for joining to the root segment along the blade longitudinal axis, particularly a tip segment including a tip of the blade 22. In some embodiments, the segmented blade may include a chordwise segment configured for joining to the root segment in a chordwise direction at a chordwise joint. For example, the chordwise segment can include a part of the blade 22 at the maximum chordwise extension of the blade 22.

In some embodiments, the gripper can be configured for supporting a segmented blade or a blade segment of the segmented blade at a blade joint of the segmented blade. In particular, the gripper may be configured for mounting a blade segment of the blade 22 to the rotor hub 20 or unmounting a blade segment of the blade 22 from the rotor hub 20, particularly a root segment of a segmented blade and/or an extension segment. In embodiments, at least two blade segments of a segmented blade may be mounted or unmounted together to the rotor hub, e.g. a full blade or a root segment together with a chordwise segment. In further embodiments, one or more blade segments of the blade, e.g. a root segment, may be mounted or unmounted individually to or from the rotor hub. In some embodiments, at least one receptacle of a blade 22 may be provided on a blade segment of the blade 22 or at a blade joint of the segmented blade. In particular, at least one receptacle may be positioned at a blade joint of the segmented blade. For example, at least one receptacle may be positioned at a chordwise joint between a root segment and a chordwise segment.

Figure 10:
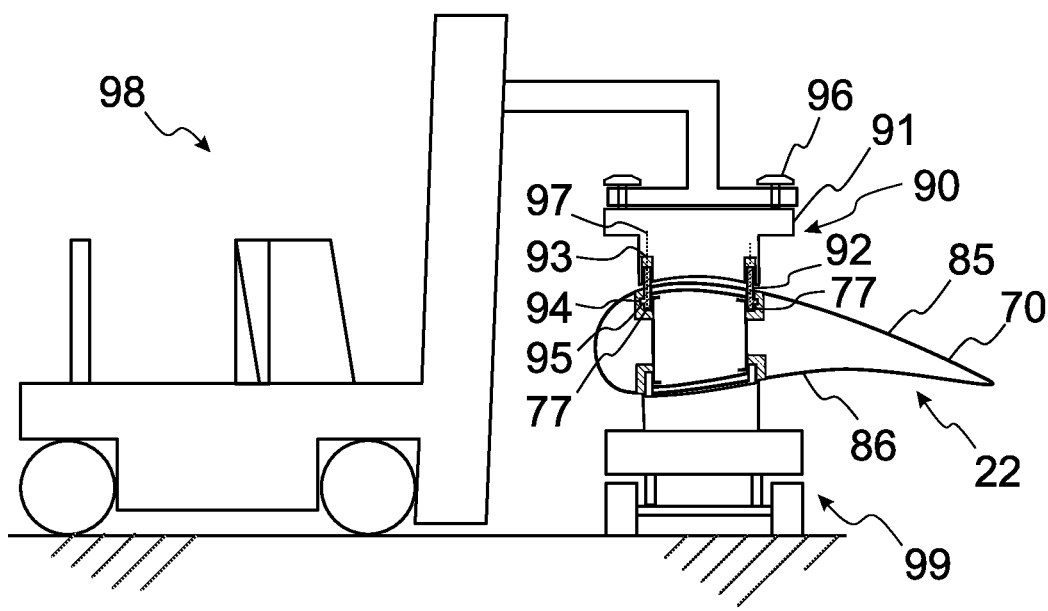
FIG. 10 illustrates a schematic view of a cargo-lifting device lifting a blade using an adapter according to embodiments of the present disclosure.

According to embodiments, an adapter 90 for handling a blade 22, particularly a blade 22 according to embodiments described herein, is provided. The adapter 90 may be configured for handling the blade 22 by a cargo-lifting device 98 particularly in the transportation process, e.g., at a blade manufacturing site or at a port. For example, FIG. 10 illustrates a cargo-lifting device 98 using an adapter 90 to lift a blade 22 onto a blade transport vehicle 99.

The adapter 90 includes adapter teeth 92 configured to be inserted into a first plurality 77 of the receptacles 78 of the blade 22. The first plurality 77 of the receptacles 78 may include first receptacles on the first side of the blade and/or second receptacles on the second side of the blade, particularly only the first receptacles or only the second receptacles.

In embodiments, the adapter teeth 92 can have a locking element 94 configured for locking the adapter teeth 92 in the first plurality 77 of the receptacles 78 of the blade 22, the adapter teeth 92 being configured for supporting the weight of the blade 22 in a direction perpendicular to a longitudinal blade axis 53.

According to embodiments, the first plurality 77 of the receptacles 78 of the blade 22 may include a locking support element 95. The locking support element 95 may be configured for transmitting the weight of the blade 22 to the adapter teeth 92 of the adapter 90. In particular, the locking support element 95 of the first plurality 77 of the receptacles 78 may be configured for providing a positive locking or a form-fitting connection with the locking element 94 of the adapter teeth 92.

According to some embodiments, the locking element 94 and the locking support element 95 may be passive locking elements. For example, the locking element 94 and the locking support element 95 may include pinholes. The locking element 94 may be manually locked to the locking support element 95, e.g., by inserting a securing pin through the pinholes. In further embodiments, the locking element 94 and the locking support element 95 may be active locking elements, particularly remotely controllable. In embodiments, the adapter 90 may include an adapter interface configured for an electrical, a pneumatic and/or a hydraulic connection to the cargo-lifting device 98.

In some embodiments, the adapter 90, particularly an active locking element of the adapter 90, includes a tooth rotation device 93 for rotating the adapter teeth 92. The tooth rotation device 93 may be particularly configured for rotating each adapter tooth 92 about a tooth axis 97, particularly a tooth axis 97 along which the adapter tooth 92 is to be inserted into one of the first plurality 77 of the receptacles 78. The tooth rotation device 93 can include an electric motor. The adapter 90 may be configured for rotating the adapter teeth 92 for providing a positive locking or a form-fitting connection between the locking element 94 of the adapter teeth 92 and the locking support element 95. According to exemplary embodiments, the locking elements 94 may include tooth threads provided on the adapter teeth 92 configured for engaging receptacle threads of the locking support elements 95 provided in the first plurality 77 of receptacles. The tooth threads may engage the receptacle threads by rotating the adapter teeth 92.

According to further exemplary embodiments, the adapter teeth 92 may have tooth protrusions or tooth recesses. The adapter teeth 92 may be inserted into the first plurality 77 of the receptacles 78. After insertion, the adapter teeth 92 may be rotated such that the tooth protrusions engage recesses of the locking support element 95 in the first plurality 77 of the receptacles 78. For example, the locking element 94 and the locking support element 95 may be configured as a bayonet mount. FIG. 10 shows an adapter 90 with adapter teeth 92 rotated after insertion of the adapter teeth 92 into the first plurality 77 of the receptacles 78. The tooth protrusions of the locking elements 94 engage recesses of the locking support elements 95 of the first plurality 77 of the receptacles 78, particularly as in a bayonet mount. In some embodiments, the adapter teeth may be rotated such that the tooth recesses engage protrusions of the locking support element 95 in the first plurality 77 of the receptacles 78.

According to embodiments, the adapter 90 includes an interlocking device 96 configured for interlocking the adapter 90 with a cargo-lifting device 98. In some embodiments, the interlocking device 96 may be remotely operable, particularly for interlocking the adapter 90 with the cargo-lifting device 98 and/or for releasing the adapter 90 from the cargo-lifting device 98. The interlocking device 96 may include at least one container lock, particularly a twist lock, a twist lock interface or a container corner fitting, e.g., according to ISO 1161. In embodiments, the interlocking device 96 includes more than one container locks, particularly four container locks.

In embodiments, the adapter 90 can include an adapter frame 91. The adapter teeth 92 and the interconnecting device 96 may be arranged on the adapter frame 91. In particular, four container locks may be arranged on the adapter frame 91 at the corners of a rectangle. In embodiments, the rectangle may have a width of minimum 1.5 m, particularly of minimum 2 m, and/or maximum 3 m, particularly maximum 2.5 m. For example, the width of the rectangle may be 2.259 m. In some embodiments, the length of the rectangle may be minimum 2 m, particularly minimum 5 m or minimum 10 m, and/or maximum 20 m, particularly maximum 15 m or maximum 13 m. For example, the length of the rectangle may be 2.787 m, 5.853 m, 8.918 m, 11.985 m or 13.509 m. In particular, the interlocking device 96 may be configured according to ISO container fittings, particularly to conform with ISO 668. The interlocking device 96 may be configured for compatibility with cargo-lifting devices 98 used in ISO container lifting. In some embodiments, a blade transportation set may include a blade 22 according to embodiments and an adapter 90 according to embodiments described herein.

Embodiments of the present disclosure may provide the advantage that during mounting of a blade to or unmounting of a blade from a rotor hub, axial loads of the blade can be supported. The blade may be lifted and rotated using a gripper, particularly without applying strong gripping forces onto the outer skin of the blade to support an axial load of the blade. According to embodiments, reinforcements to the loadbearing structure of the blade or to the outer skin of the blade to support strong gripping forces for holding the blade using friction may be avoided. Rotating the blade may enable mounting the blade at a lower height with respect to the ground or at various orientations with respect to the rotor hub. In particular, cranes with a lower height may be used for mounting or unmounting the blade. A number of angular motions of the rotor hub during mounting or unmounting may be reduced. The use of an adapter may simplify transport of blades according to embodiments. In embodiments, time and/or costs for mounting, unmounting or transporting blades may be reduced, in particular crane costs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A method of mounting a blade to or unmounting a blade from a rotor hub of a wind turbine, the wind turbine having a tower and a nacelle mounted on the tower, the rotor hub coupled to the nacelle, the method comprising:
   gripping the blade using a gripper, the gripper having gripping members configured to grip the blade and teeth protruding from the gripping members, wherein gripping comprises inserting the teeth of the gripper into receptacles of the blade; and
   rotating the blade about a rotation axis perpendicular to a longitudinal blade axis using a blade rotation device of the gripper, wherein the teeth are configured to transmit an axial load of the blade to the gripping members.

2. The method according to claim 1, wherein rotating the blade comprises rotating the blade by an angle of at least 20 degrees about the rotation axis of the blade rotation device.

3. The method according to claim 1, wherein inserting the teeth comprises inserting a first set of the teeth into a first set of the receptacles on a first side of the blade, and inserting a second set of the teeth into a second set of the receptacles on a second side of the blade.

4. The method according to claim 1, wherein gripping comprises retracting the teeth into the gripping members to a retracted position before inserting the teeth, and wherein inserting the teeth comprises extending the teeth to an extended position to engage the receptacles of the blade.

5. The method according to claim 1, wherein gripping the blade comprises engaging an outer skin of the blade with gripper pads of the gripping members.

* * * * *